Patented Dec. 17, 1940

2,225,604

UNITED STATES PATENT OFFICE 2,225,604

COLORING COMPOSITION

Herbert A. Lubs, Wilmington, and Crayton K. Black, Bellefonte Heights, Del., assignors to E. I. du Pont de Nemours & Company, Wilmington, Del., a corporation of Delaware No Drawing. Application June 13, 1939, Serial No. 278,900

19 Claims. (Cl. 8—85)

This invention relates to coloring compositions and more particularly to coloring compositions for coloring leather, wood, paper, textiles, viscose and the like.

Pigments are coloring materials which are essentially insoluble in oil, alcohol and water. The only methods known heretofore for the use of such pigments have been by mechanically incorporating the pigment in a vehicle in which it is insoluble, usually by grinding or some similar mechanical means, and by forming the pigment in the vehicle to disperse the pigment therein. Pigments have the advantageous properties of being fast to light and slow to bleed. However, due to their insolubility, their dispersion in liquid media has been relatively poor, which has greatly restricted their use. There are dyes which are soluble in some non-aqueous media such as oil and alcohol, and such solutions provide excellent dispersion. However, such dyes as are soluble in oil and alcohol have very poor light fastness as compared to pigments. Accordingly, it has not been possible heretofore to obtain coloring compositions having the advantageous properties of pigments such as light fastness and lack of bleed, and the dispersion of a solution.

It is an object of the present invention to provide coloring compositions which have a combination of the valuable properties of pigments and the valuable properties of dye solutions. Another object is to provide coloring compositions which comprise solutions of pigments. A further object is to provide coloring compositions comprising solutions of pigments which are valuable for coloring leather, wood, paper, textiles, viscose and the like, in fast non-bleeding shades. A still further object is to provide a new and improved method of coloring materials such as leather, wood, textiles, textile fibers, paper, viscose and the like. Other objects are to provide new compositions of matter and to advance the art. Still other objects will appear hereinafter.

The above and other objects may be accomplished in accordance with our invention which comprises dissolving pigments of the type of azo pigment dyes, acid dye metal salts, basic dye pigments and nitroso pigments in normally liquid N-aliphatic substituted aliphatic acid amides free of acidic substituents. We have discovered that such amides are excellent solvents for such pigments and that the resulting solutions are highly penetrative and are excellent coloring compositions for coloring leather; textiles such as cotton, wool, silk, rayon; paper, "Cellophane," glassine, wall paper and paper coated with aluminum, tin, silver and the like; viscose and like materials. The coloring compositions have superior tinctorial properties, are fast to light, washing and crocking, and have unusally high color strength and covering properties.

The solvents to be employed in accordance with our invention are the normally liquid N-aliphatic substituted aliphatic acid amides in which the aliphatic radicles may contain hydroxy, alkoxy, halogen, amino, alkylamino, and like substituents, but no acidic substituents. These solvents may be designated by the formula

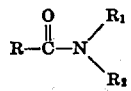

wherein R represents hydrogen or an aliphatic radicle, $R_1$ represents hydrogen or an aliphatic radicle, and $R_2$ represents an aliphatic radicle. Preferably, R represents hydrogen and $R_1$ and $R_2$ represent alkyl radicles, and preferably the lower alkyl radicles of 1 to 6 carbon atoms. In other words, our preferred compounds are the normally liquid unsubstituted N-alkyl alkyl-acid amides, and particularly the N-dialkyl formamides. However, within the broad aspects of our invention, we intend to include the N-mono and di-aliphatic substituted formamides in which the aliphatic groups contain up to 12 carbon atoms, the N-mono and di-aliphatic substituted acetamides where the aliphatic radicles contain up to 6 carbon atoms and other N-mono and di-aliphatic substituted acid amides which are normally liquid; that is, which are liquid at ordinary room temperatures. By the term "aliphatic," we intend to include saturated hydrocarbon radicles, unsaturated hydrocarbon radicles and other radicles of the aliphatic series containing hydroxy, alkoxy, halogen, amino, alkylamino and like substituents, but to exclude radicles containing benzene or other aromatic rings. By the term "alkyl," we intend to include only the unsubstituted saturated aliphatic hydrocarbon radicles.

Amongst the solvents which we have found to be particularly satisfactory for our purpose are:

N-dimethyl formamide

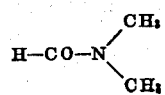

N-monomethyl formamide
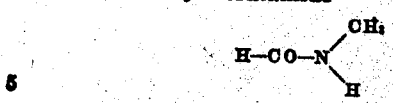

N-mono-ethanol formamide
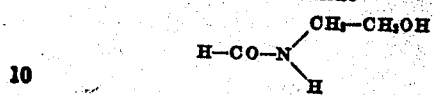

N-monoisobutyl formamide
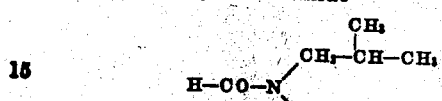

N-dimethyl acetamide
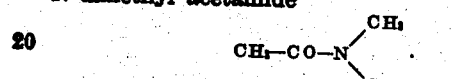

N-dimethyl butyramide
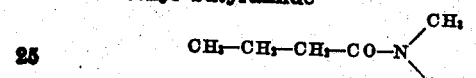

N-dimethyl valeramide
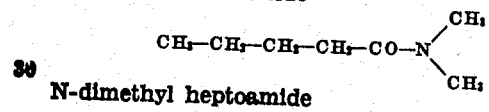

N-dimethyl heptoamide
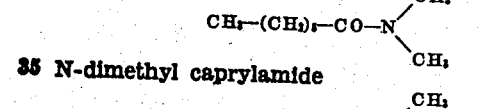

N-dimethyl caprylamide
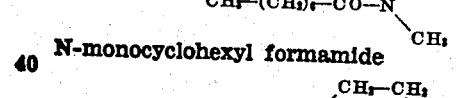

N-monocyclohexyl formamide
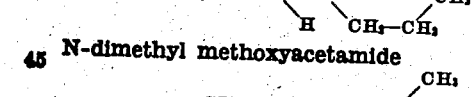

N-dimethyl methoxyacetamide
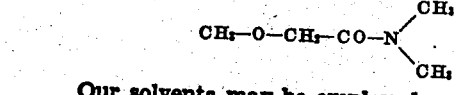

Our solvents may be employed as the sole solvent for the pigment or they may be diluted with small amounts of alcohol, water or other solvents. Also the coloring compositions may contain any of the usual binders such as shellac, rosin, ethyl cellulose, cellulose acetate, glue, size, casein and other natural and synthetic gums and resins, and the like. The proportions of ingredients and their nature may be very greatly varied as desired in accordance with the material to be colored, the method of coloring and the results desired.

In order to illustrate our invention more clearly, the preferred modes of carrying the same into effect and the advantageous results to be obtained, the following examples are given in which the parts are by weight:

Example 1

10 parts of the phosphotungstic acid salt of Rhodamine (Color Index #752) which is insoluble in oil and water and is used in pigment work, were dissolved in 100 parts of N-dimethyl formamide by heating to the boil. 5 parts of ethyl cellulose were dissolved in this dye solution and, after cooling, the resulting composition was printed on paper from a spirit type printing press with rubber rolls. The resulting print, which dries rapidly by evaporation of the solvent, is much superior in light fastness to one from an orthodox spirit ink containing alcohol, an alcohol soluble dye and a binder. It is much superior tinctorially to a print from a spirit ink containing the same pigment in suspended form. This ink, containing a pigment dissolved in N-dimethyl formamide, has the tinctorial strength and color dispersion of spirit ink, containing an alcohol soluble dye, but, in addition, has the fastness properties of a pigmented ink.

The following pigments were substituted for the phosphotungstate of Rhodamine with satisfactory results:

Phosphotungstomolybdate of methyl violet (Color Index #680)
Tannic acid salt of methyl violet (Color Index #680)
The pigment dyes 3 nitro 4 amino toluene ⟶ aceto acet anilide
3 nitro 4 amino toluene ⟶ B naphthol (Color Index #69)
3 nitro 4 amino toluene ⟶ m nitro anilide of 2:3 hydroxy naphthoic acid
The barium salt of 2 amino toluene 5 sulfonic acid ⟶ B naphthol
The strontium salt of 4 chlor aniline 3 sulfonic acid ⟶ 2:3 hydroxy naphthoic acid These inks may be diluted with small amounts of alcohol, water or other solvents, provided sufficient diluent is not added to precipitate the pigment.

The binder may be varied. Such materials as shellac, rosin and cellulose acetate have been found satisfactory.

uhcS m

Such materials as "Cellophane," glassine, etc. may be printed as well as paper.

Example 2

2.5 parts of the phosphotungstate of Victoria Blue (Color Index #729) and 5 parts of cellulose acetate were dissolved in 50 parts of N-dimethyl formamide. This composition was printed on cotton cloth from a copper engraved roll. A sharply defined print of good fastness to washing, crocking and light was obtained. An orthodox pigmented cellulose acetate lacquer will crock off badly under the same conditions. By this process, textiles may be printed directly, without wetting the cloth or aftertreating, to produce excellent prints. The method is applicable to cotton, wool, silk, rayon, etc.

In addition to the pigments mentioned in Examples 1 and 2 the following have been successfully employed:

Phosphotungstate of Blue 6G (Color Index #663)
Phosphotungstate of Blue G (Color Index #658)
Phosphotungstate of Thioflavine TCN (Color Index #815)

The binder may be varied. Ethyl cellulose has been used with great success. A great many natural and synthetic gums and resins are soluble in N-dimethyl formamide and may be used.

Example 3

0.2 part of the phosphotungstate of Rhodamine (Color Index #752) were dissolved in 10 parts of N-dimethyl formamide. This solution was added to 40 parts of wall paper size made as follows:

Dissolve
  50 parts of glue in
  250 parts of water. Add to
  700 parts of china clay in
  600 parts of water.

This colored size was brushed on wall paper in the usual manner. The resulting color was much stronger than one produced by an equivalent amount of pigment, in paste form, added to an equivalent amount of size.

It is likely that the pigment particles are precipitated by the size from the N-dimethyl formamide solution in a very high degree of dispersion to produce the exceptional strength evidenced in this process.

A casein or other wall paper or coated paper binder may be substituted for the one cited.

The ferrous complex of nitroso beta naphthol, which is used in paper coating work, is especially adaptable to the process of this invention.

Pigments of the type mentioned in the preceding examples may be used.

Example 4

1 part of ethyl cellulose and 1 part of the phosphotungstate of Auramine (Color Index #655) were dissolved in 50 parts of N-dimethyl formamide. The resulting solution was applied to an aluminum coated paper to produce a gold effect of excellent light fastness.

The azo pigment dye, 3-nitro-4-amino-anisole→aceto acet p-toluidide, may be substituted for the pigment above with satisfactory results.

An effect similar to that described above may be obtained by applying the solution to tin or other silver colored foils.

Example 5

10 parts of the phosphotungstate of Rhodamine (Color Index #752) were dissolved in 100 parts of N-dimethyl formamide. This solution was sprayed on grain leather to produce a level coloration of good fastness to crocking, light, water, etc.

In addition to the pigments mentioned in the previous examples, the following have shown to considerable advantage on leather.

Phosphotungstate of Victoria Green (Color Index #657)
Phosphotungstate of Phosphine 2G (Color Index #793)
Phosphotungstate of Methylene Blue BX (Color Index #922)

Satisfactory browns and blacks can also be made by mixtures.

While spraying is the preferred method of application, these pigments in solution may be applied by brushing, tray dipping or in the drum.

Vegetable and chrome tanned leathers may be colored in this manner on either the grain or suede side. It is especially applicable to fabricated leather articles.

Example 6

10 parts of the azo pigment dye, 3-nitro-4-amino toluene→ aceto acet anilide, were dissolved in 100 parts of N-dimethyl formamide. This solution was added to viscose containing the equivalent of 1000 parts of regenerated cellulose. The viscose was then subjected to the usual processes of spinning in fibers or sheets, regeneration and washing of the cellulose. The resulting product exhibits greater color strength than material pigmented in the orthodox manner.

It will be understood that the above examples are given solely for illustrative purposes. Many other variations can be made in the ingredients employed and in the proportions. Many other pigments of the classes of azo pigment dyes, acid dye metal salts, basic dye pigments and nitroso pigments may be used. Also, other solvents may be employed such as:

N-di-ethanol formamide
N-mono-ethyl formamide
N-diethyl formamide
N-mono-propyl formamide
N-dipropyl formamide
N-mono-isopropyl formamide
N-diisopropyl formamide
N-diisobutyl formamide
N-mono-butyl formamide
N-dibutyl formamide
N-mono-amyl formamide
N-mono-isoamyl formamide
N-di-cyclohexyl formamide
N-mono-hexyl formamide
N-mono-heptyl formamide
N-mono- and di-ethyl acetamides
N-mono- and di-propyl acetamides
N-mono- and di-butyl acetamides
N-mono- and di-amyl acetamides
N-mono- and di-hexyl acetamides
N-mono- and di-cyclohexyl acetamides
N-morpholine acetamide
N-di-methyl propionamide
N-di-ethyl propionamide
N-di-ethyl butyramide Due to the unusual solvent properties of our solvents, it is possible to prepare solutions of pigments which are insoluble in water, oil, alcohol and other organic solvents. The coloring properties of the pigment are retained and at the same time the excellent dispersion of a solution is obtained. The compounds are essentially neutral and do not interfere with the other properties of the pigments or the properties of the other ingredients. With the use of our solvents, it is possible to produce spirit type prints which are fast to light, water and oil, and have good strength and levelness. This combination of properties is impossible to attain otherwise with either spirit soluble colors or pigmented spirit inks. Also, while regular lacquer prints are not fast to crocking, and orthodox prints which are fast to crocking require a wet processing of the cloth, by the employment of our solvents, it is possible to obtain lacquer type prints of good fastness to light, washing and crocking on textiles. Further, by the use of our solvents, the strength of pigments for wall paper and coated paper can be increased and it is possible to obtain colored foil types which are fast to light.

Because of variation from hide to hide, tanners have not been able to uniformly color a batch of skins and it was necessary to select the skins according to size, weight, grade and shade. By surface coloring hides in accordance with our invention, it is possible to obtain uniform shades from skins preselected for size, weight and grade alone. Also, by our invention, it is possible to surface color skins which have already been dyed and are off shade. The hiding power of the pigment, when employed in accordance with our invention, is so great as to mask the color of the skin. Water and spirit soluble dyes do not exhibit such hiding power. Further, it is possible, by the use of our invention, to obtain greater color strength in pigmenting viscose.

We claim:

1. A coloring composition comprising a pigment of the group consisting of azo pigment dyes, acid dye metal salts, basic dye pigments and nitroso pigments dissolved in a normally liquid N- aliphatic substituted amide of a monocarboxylic aliphatic acid which amide is free of acidic substituents.

2. A coloring composition comprising a pigment of the group consisting of azo pigment dyes, acid dye metal salts, basic dye pigments and nitroso pigments dissolved in a normally liquid N-alkyl substituted amide of a lower mono-carboxylic aliphatic acid which amide is free of acidic substituents.

3. A coloring composition comprising a pigment of the group consisting of azo pigment dyes, acid dye metal salts, basic dye pigments and nitroso pigments dissolved in a normally liquid N-lower di-alkyl substituted amide of a lower mono-carboxylic aliphatic acid which amide is free of acidic substituents.

4. A coloring composition comprising a pigment of the group consisting of azo pigment dyes, acid dye metal salts, basic dye pigments and nitroso pigments dissolved in a normally liquid N-dimethyl substituted amide of a lower monocarboxylic aliphatic acid which amide is free of acidic substituents.

5. A coloring composition comprising a pigment of the group consisting of azo pigment dyes, acid dye metal salts, basic dye pigments and nitroso pigments dissolved in N-dimethyl methoxyacetamide.

6. A coloring composition comprising a pigment of the group consisting of azo pigment dyes, acid dye metal salts, basic dye pigments and nitroso pigments dissolved in a normally liquid N-aliphatic substituted amide of an unsubstituted monocarboxylic aliphatic acid which amide is free of acidic substituents.

7. A coloring composition comprising a pigment of the group consisting of azo pigment dyes, acid dye metal salts, basic dye pigments and nitroso pigments dissolved in a normally liquid N-lower alkyl substituted amide of a lower unsubstituted monocarboxylic aliphatic acid.

8. A coloring composition comprising a pigment of the group consisting of azo pigment dyes, acid dye metal salts, basic dye pigments and nitroso pigments dissolved in an N-lower alkyl substituted formamide.

9. A coloring composition comprising a pigment of the group consisting of azo pigment dyes, acid dye metal salts, basic dye pigments and nitroso pigments dissolved in an N-lower dialkyl substituted formamide.

10. A coloring composition comprising a pigment of the group consisting of azo pigment dyes, acid dye metal salts, basic dye pigments and nitroso pigments dissolved in N-dimethyl formamide.

11. A coloring composition comprising a binder and a pigment of the group consisting of azo pigment dyes, acid dye metal salts, basic dye pigments and nitroso pigments dissolved in a normally liquid N-aliphatic substituted amide of a monocarboxylic aliphatic acid which amide is free of acidic substituents.

12. The method of coloring a material of the class of leather, textiles, textile fibers and paper which comprises applying to the surface of such material a coloring composition comprising a pigment of the group consisting of azo pigment dyes, acid dye metal salts, basic dye pigments and nitroso pigments dissolved in a normally liquid N-aliphatic substituted amide of a monocarboxylic aliphatic acid which amide is free of acidic substituents, and then evaporating off the amide.

13. The method of coloring a material of the class of leather, textiles, textile fibers and paper which comprises applying to the surface of such material a coloring composition comprising a pigment of the group consisting of azo pigment dyes, acid dye metal salts, basic dye pigments and nitroso pigments dissolved in a normally liquid N-lower di-alkyl substituted amide of a lower monocarboxylic aliphatic acid which amide is free of acidic substituents, and then evaporating off the amide.

14. The method of coloring a material of the class of leather, textiles, textile fibers and paper which comprises applying to the surface of such material a coloring composition comprising a pigment of the group consisting of azo pigment dyes, acid dye metal salts, basic dye pigments and nitroso pigments dissolved in N-dimethyl methoxyacetamide, and then evaporating off the amide.

15. The method of coloring a material of the class of leather, textiles, textile fibers and paper which comprises applying to the surface of such material a coloring composition comprising a pigment of the group consisting of azo pigment dyes, acid dye metal salts, basic dye pigments and nitroso pigments dissolved in a normally liquid N-lower alkyl substituted amide of a lower unsubstituted monocarboxylic aliphatic acid, and then evaporating off the amide.

16. The method of coloring a material of the class of leather, textiles, textile fibers and paper which comprises applying to the surface of such material a coloring composition comprising a pigment of the group consisting of azo pigment dyes, acid dye metal salts, basic dye pigments and nitroso pigments dissolved in N-dimethyl formamide, and then evaporating off the amide.

17. The method of coloring a material of the class of leather, textiles, textile fibers and paper which comprises applying to the surface of such material a coloring composition comprising a binder and a pigment of the group consisting of azo pigment dyes, acid dye metal salts, basic dye pigments and nitroso pigments dissolved in a normally liquid N-aliphatic substituted amide of a monocarboxylic aliphatic acid which amide is free of acidic substituents, and then evaporating off the amide.

18. A coloring composition comprising a pigment of the group consisting of azo pigment dyes, acid dye metal salts, basic dye pigments and nitroso pigments dissolved in N-dimethyl acetamide.

19. The method of coloring a material of the class of leather, textiles, textile fibers and paper which comprises applying to the surface of such material a coloring composition comprising a pigment of the group consisting of azo pigment dyes, acid dye metal salts, basic dye pigments and nitroso pigments dissolved in N-dimethyl acetamide, and then evaporating off the amide.

HERBERT A. LUBS.
CRAYTON K. BLACK.